US009565285B2

(12) United States Patent
Theverapperuma et al.

(10) Patent No.: US 9,565,285 B2
(45) Date of Patent: Feb. 7, 2017

(54) CELLULAR NETWORK COMMUNICATIONS WIRELESS HEADSET AND MOBILE DEVICE

(71) Applicant: Apple Inc., Cupertino, CA (US)

(72) Inventors: Lalin S. Theverapperuma, Cupertino, CA (US); Baptiste P. Paquier, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 4 days.

(21) Appl. No.: 14/185,752

(22) Filed: Feb. 20, 2014

(65) Prior Publication Data

US 2015/0237185 A1    Aug. 20, 2015

(51) Int. Cl.
*H04B 7/00* (2006.01)
*H04M 1/60* (2006.01)
*H04W 76/02* (2009.01)
*H04W 4/00* (2009.01)

(52) U.S. Cl.
CPC .......... *H04M 1/6066* (2013.01); *H04W 4/008* (2013.01); *H04W 76/023* (2013.01)

(58) Field of Classification Search
CPC .................................................. H04M 1/6066
USPC ............... 455/41.1, 41.2, 41.3; 381/311
See application file for complete search history.

(56) References Cited

U.S. PATENT DOCUMENTS

| 2001/0000505 | A1* | 4/2001 | Segal ................... G06Q 20/32 |
| | | | 455/405 |
| 2008/0144645 | A1 | 6/2008 | Russell et al. |
| 2009/0068949 | A1 | 3/2009 | Lin |
| 2009/0169024 | A1 | 7/2009 | Krug et al. |
| 2009/0279722 | A1* | 11/2009 | Lin ........................ H04R 5/04 |
| | | | 381/311 |
| 2009/0318081 | A1* | 12/2009 | Winter ................... H04L 12/66 |
| | | | 455/41.2 |

* cited by examiner

*Primary Examiner* — Hsin-Chun Liao
(74) *Attorney, Agent, or Firm* — Blakely, Sokoloff, Taylor & Zafman LLP

(57) ABSTRACT

A headset that communicates with a mobile device through a local radio frequency (RF) communication link to conduct a telephone call is described. The headset includes a local RF communication modem that receives downlink packets from the mobile device through the local RF communication link. The downlink packets were received by the mobile device through a wireless communication link. The headset includes an audio decoder that decodes the downlink packets into a downlink audio signal to be played back at the headset. The headset also includes an audio encoder that encodes an uplink audio signal produced by the headset into uplink packets. The local RF communication modem sends the uplink packets to the mobile device through the local RF communication link. Other embodiments are also described and claimed.

15 Claims, 8 Drawing Sheets

CELLULAR NETWORK COMMUNICATIONS WIRELESS HEADSET AND MOBILE DEVICE

FIELD

An embodiment of the invention is related to digital audio signal processing techniques in mobile devices and headsets, and particularly to techniques for decoding/encoding audio packets at mobile devices and headsets. Other embodiments are also described.

BACKGROUND

A mobile phone (also known as a cellular phone, and a cell phone) enables its user to make and receive telephone calls over a cellular communication network while moving around a wide geographic area. To allow hands-free operation of a mobile phone, a headset is often used alongside the mobile phone during a phone call. A headset has a pair of left and right earphones or headphones combined with a microphone, or one headphone with a microphone, in a way that can be worn by the user in a hands-free manner (e.g., as an over-the-head unit, a tethered and wired unit, a wireless ear worn unit). Headsets provide the equivalent functionality of a telephone handset but with hands-free operation.

FIG. 1 illustrates a detailed diagram of a cellular phone 130 that works together with a Bluetooth headset 110 to enable hands-free operation during a telephone call. Specifically, this figure shows a Bluetooth headset 110 connected to a cellular phone 130 through a Bluetooth link 160. The Bluetooth headset 110 includes a Bluetooth audio decoder 112, a Bluetooth audio encoder 115, a Bluetooth flow/rate control logic 118, a Bluetooth modem and radio module 120, a speaker 122, and a microphone 125. The cellular phone 130 enables a near-end user to make and receive telephone calls to or from a far-end user over a VoLTE link 165. The cellular phone 130 includes a Bluetooth modem and radio module 132, a Bluetooth audio encoder 135, a Bluetooth audio decoder 138, an audio processing unit 140, a Bluetooth flow/rate control logic 142, an Adaptive Multi-Rate (AMR) audio decoder 145, an AMR audio encoder 148, a cellular flow/rate control logic 152, and a baseband radio and modem 150.

During a telephone call, the baseband radio and modem 150 of the cellular phone 130 receives downlink cellular packets from the far-end user through the VoLTE link 165. The downlink cellular packets contain a downlink audio signal that is encoded with a speech coding standard such as adaptive multi-rate wideband (AMR-WB) for transmission over the VoLTE link 165. The baseband radio and modem 150 sends the cellular packets to the AMR audio decoder 145. The AMR audio decoder 145 decodes the cellular packets into an audio stream and sends the stream to the audio processing unit 140. The audio processing unit 140 processes the stream to enhance audio quality and sends the processed stream to the Bluetooth audio encoder 135. The Bluetooth audio encoder 135 encodes the processed stream into Bluetooth packets based on an audio subband codec such as high-efficiency advanced audio coding (HE-AAC) or low complexity subband coding (SBC). The Bluetooth audio encoder 135 sends the Bluetooth packets to the Bluetooth modem and radio module 132, which then transmits the Bluetooth packets to via the Bluetooth link 160. The Bluetooth flow/rate control logic 142 manages the rate of data transmission from the mobile device 130 to the Bluetooth headset 110 by controlling the encoding of Bluetooth packets at the Bluetooth audio encoder 135.

The Bluetooth modem and radio module 120 of the Bluetooth headset 110 receives the Bluetooth packets from the cellular phone 130 through the Bluetooth link 160. The Bluetooth modem and radio module 120 then sends the Bluetooth packets to the Bluetooth audio decoder 112, which decodes the Bluetooth packets into an audio signal stream. The speaker 122 receives the audio signal stream and converts it into sound for the user of the Bluetooth headset 110.

The microphone 125 of the Bluetooth headset 110 produces an uplink audio signal stream. The Bluetooth audio encoder 115 encodes the uplink audio signal into Bluetooth packets. The Bluetooth flow/rate control logic 118 manages the rate of data transmission from the Bluetooth headset 110 to the cellular phone 130 by controlling the encoding of Bluetooth packets at the Bluetooth audio encoder 115. The Bluetooth modem and radio module 120 receives the Bluetooth packets from the Bluetooth audio encoder 115 and transmits them via the Bluetooth link 160.

The local modem and radio module 132 of the cellular phone 130 receives the Bluetooth packets from the Bluetooth headset 110 through the Bluetooth link 160. The local modem and radio module 132 then sends the Bluetooth packets to the Bluetooth audio decoder 138, which decodes the Bluetooth packets into an audio signal stream. The audio processing unit 140 may process the audio signal stream to enhance audio quality and send the processed audio signal stream to the AMR audio encoder 148. The AMR audio encoder 148 encodes the processed audio signal stream into uplink cellular packets and sends the uplink cellular packets to the baseband radio and modem 150. The uplink cellular packets contain the uplink audio signal that is encoded with a speech coding standard such as adaptive multi-rate wideband (AMR-WB) for transmission over the VoLTE link 165. The cellular flow/rate control logic 152 manages the rate of data transmission from the cellular phone 130 to the VoLTE link 165 by controlling the encoding of cellular packets at the AMR audio encoder 148. The baseband radio and modem 150 sends the uplink cellular packets to the device of the far-end user through the VoLTE link 165.

As illustrated in FIG. 1, during a telephone call, the incoming or downlink audio packets are decoded by the AMR audio decoder 145 and then encoded by the Bluetooth audio encoder 135 at the cellular phone 130, and then decoded by the Bluetooth audio decoder 112 at the Bluetooth headset 110. During the same telephone call, the outgoing or uplink audio packets are encoded by the Bluetooth audio encoder 115 at the Bluetooth headset 110, and then decoded by the Bluetooth audio decoder 138 and encoded by the AMR audio encoder 148 at the cellular phone 130. The flow control and buffering is done at multiple places, e.g., by the Bluetooth flow/rate control logic 118 at the Bluetooth headset 110, and the Bluetooth flow/rate control logic 142 and cellular flow/rate control logic 152 at the cellular phone 130.

SUMMARY

A headset that communicates with a mobile device through a local radio frequency (RF) communication link to conduct a telephone call is described. The headset includes a local RF communication modem that receives downlink packets from the mobile device through the local RF communication link. The downlink packets were received by the mobile device through a wireless communication link (e.g., from a cellular network base station, a wireless network access point, or a WiMAX gateway device). The headset further includes an audio decoder that decodes the downlink packets into a downlink audio signal to be converted into sound by a speaker at the headset. The headset also includes an audio encoder that encodes an uplink audio signal, produced using a microphone in the headset, into uplink packets. The local RF communication modem sends the uplink packets to the mobile device via the local RF communication link. The uplink packets will be transmitted by the mobile device over the wireless communication link.

In one embodiment, the downlink and uplink packets are encapsulated inside local RF packets when transmitted over the local RF communication link. In one embodiment, the headset includes a composite flow control logic that controls a first data transmission rate for transmitting data from the headset to the mobile device over the local RF communication link, a second data transmission rate for transmitting data from the mobile device to the headset over the local RF communication link, and a third data transmission rate for transmitting data from the mobile device to a far-end user's device over the wireless communication link. In one embodiment, the headset includes a call setup logic that performs continuous voice activity detection. The call setup logic includes a phrase identification logic that identifies phrases uttered by a user.

A method for a headset to communicate with a mobile device through a local RF communication link to conduct a telephone call is described. The method receives downlink packets from the mobile device through the local RF communication link. The method decodes the downlink packets into a downlink audio signal. The method processes the downlink audio signal and converts the processed downlink audio signal into sound through a speaker of the headset. The method produces an uplink audio signal through a microphone of the headset. The method encodes the uplink audio signal into uplink packets. The method sends the uplink packets to the mobile device through the local RF communication link.

An electronic device that communicates with a headset through a local RF communication link to conduct a telephone call is described. The electronic device includes a cellular communication modem that receives downlink cellular packets from a far-end user through a cellular communication link. The electronic device includes a local RF communication modem that sends the received downlink cellular packets to the headset without performing audio decoding upon them, and receives uplink cellular packets from the headset through the local RF communication link. The cellular communication modem sends out the uplink cellular packets to the far-end user through the cellular communication link without performing audio encoding upon them.

In one embodiment, the electronic device includes a local flow control logic that controls a rate of sending the downlink cellular packets by the local RF communication modem. The electronic device also includes a baseband flow control logic that controls a rate of sending the uplink cellular packets by the cellular communication modem. The local flow control logic and the baseband flow control logic are controlled by a composite flow control logic at the headset.

A method for an electronic device to communicate with a headset through a wireless connection to conduct a telephone call is described. The method receives downlink cellular packets from a cellular communication network through a cellular communication modem. A downlink audio signal was audio encoded in the downlink cellular packets by the cellular communication network. The method sends the downlink cellular packets to the headset through the wireless connection without audio decoding to extract the downlink audio signal. The method also receives uplink cellular packets from the headset through the wireless connection. An uplink audio signal was audio encoded in the uplink cellular packets by the headset, for transmission over the cellular communication network. The method sends the uplink cellular packets to the cellular communication network through the cellular communication modem without audio encoding of the uplink audio signal.

The above summary does not include an exhaustive list of all aspects of the invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The present invention is illustrated by way of example and not limitation in the figures of the accompanying drawings in which like references indicate similar elements.

DETAILED DESCRIPTION

A headset system that enables cellular packets sent or received at a mobile device to be encoded or decoded by a headset working in concert with the mobile device, while eliminating cellular audio decoding and cellular audio encoding at the mobile device, is described. In the following description, numerous specific details are set forth to provide thorough explanation of embodiments of the invention. It will be apparent, however, to one skilled in the art, that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow are performed by processing logic that comprises hardware (e.g., circuitry, dedicated logic, etc.), software (such as is run on a general-purpose device or a dedicated machine), or a combination of both. Although the processes are described below in terms of some sequential operations, it should be appreciated that some of the operations described may be performed in different order. Moreover, some operations may be performed in parallel rather than sequentially.

Encoding and decoding of an audio signal is a nonlinear process, especially when using a parametric coding algorithm. There is significant quality degradation each time an audio signal is encoded and then decoded, especially when tandem encoding and decoding are performed with different codecs that have vastly different encoding schemes, as described in FIG. 1 above.

Figure 1:
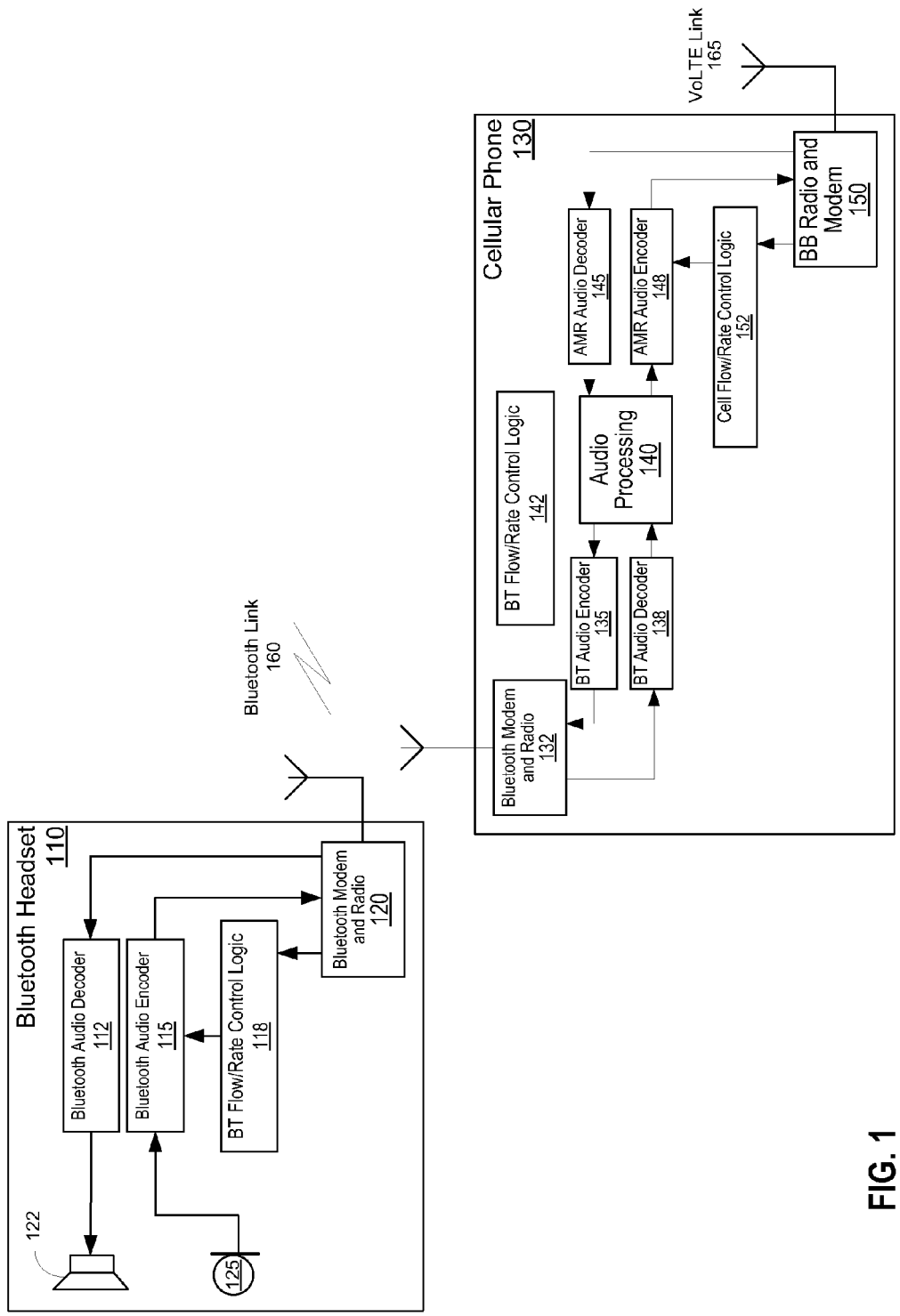
FIG. 1 illustrates a detailed diagram of a mobile device that works together with a headset to enable hands-free operation during a telephone call.

There is also large audio latency in the system of FIG. 1 above. For example, at the baseband modem 150, delays are introduced in order to wait for the decoder/encoder to be ready. After decoding, buffering has to be performed before and after Inter-IC Sound ($I^2S$) interface, and at the audio processing unit 140. Delays are also introduced by Bluetooth encoding and decoding. Furthermore, because there are two or more flow/rate control logic modules working in isolation, these flow/rate control logic modules increase latency as well as jitter. This degrades audio communication quality.

An embodiment of the invention is a headset system in which cellular packets sent or received at a mobile device are audio encoded and/or audio decoded by a headset, while eliminating audio decoding and/or audio encoding of cellular packets at the mobile device. This headset system may improve uplink and/or downlink audio quality during a telephone call by having only one audio signal encoding/decoding stage. Encoding/decoding delays and packet level buffering are also reduced. Furthermore, by moving the audio encoding and/or audio decoding of cellular packets to the headset, an operating point of the voice encoder can be changed based on the combined radio frequency (RF) channel conditions of the cellular communication link and the short-range (or local RF) communication link, thus improving flow control with signal encoding/decoding. An encoder operating point is used to control the encoding rate of encoder that results in different average data rates.

Figure 2:
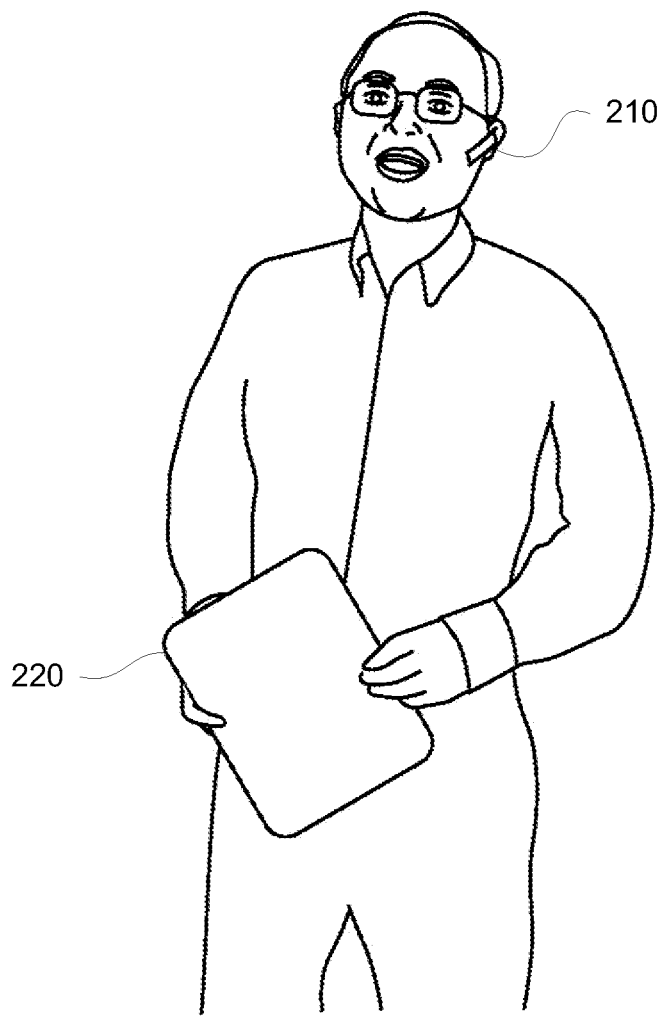
FIG. 2 illustrates a user using a headset system in accordance with one embodiment of the invention.

FIG. 2 illustrates a user using a headset system in accordance with one embodiment of the invention. Specifically, the user in the figure is using a wireless headset 210 and is holding a mobile device 220 to participate in a telephone conversation. The headset 210 is a headphone combined with a microphone, or it may be a pair of headphones with a microphone, or any personal listening electronic device that can provide the equivalent functionality of a telephone handset but with hands-free operation. The mobile device 220 can be a cellphone, a smartphone, a tablet computer, a personal digital assistant (PDA), a laptop computer, a device equipped on a vehicle, a boat, or a bicycle, and which is capable of receiving and sending cellular network communications signals, e.g., from and to a cellular network base station, or any personal electronic device that is capable of receiving and sending cellular network communications signals. The headset 210 and the mobile device 220 work together to enable the user to have both hands free during the telephone conversation with a far-end user over the cellular communication network.

In one embodiment, the mobile device 220 receives downlink cellular packets from the cellular communication network and forwards the downlink cellular packets to the headset 210 through a local short-range communication link. The downlink cellular packets contain a downlink audio signal that is encoded in accordance with a speech coding algorithm such as adaptive multi-rate wideband (AMR-WB) suitable for transmission over a cellular communication network. The headset 210 receives the downlink cellular packets, and decodes them into a downlink audio signal to be converted into sound by a speaker in the headset 210. When the near-end user speaks, one or more microphones of the headset 210 pick up the near-user's voice and produce an uplink audio signal based on it. The uplink audio signal is then encoded into uplink cellular packets at the headset 210, using a speech coding algorithm such as adaptive multi-rate wideband (AMR-WB) suitable for transmission over the cellular communication network. The headset sends the uplink cellular packets to the mobile device 220, which in turn sends the uplink cellular packets to the far-end user of the telephone conversation through the cellular communication network. The mobile device 220 does not need to audio decode or audio encode the cellular packets.

Figure 3:
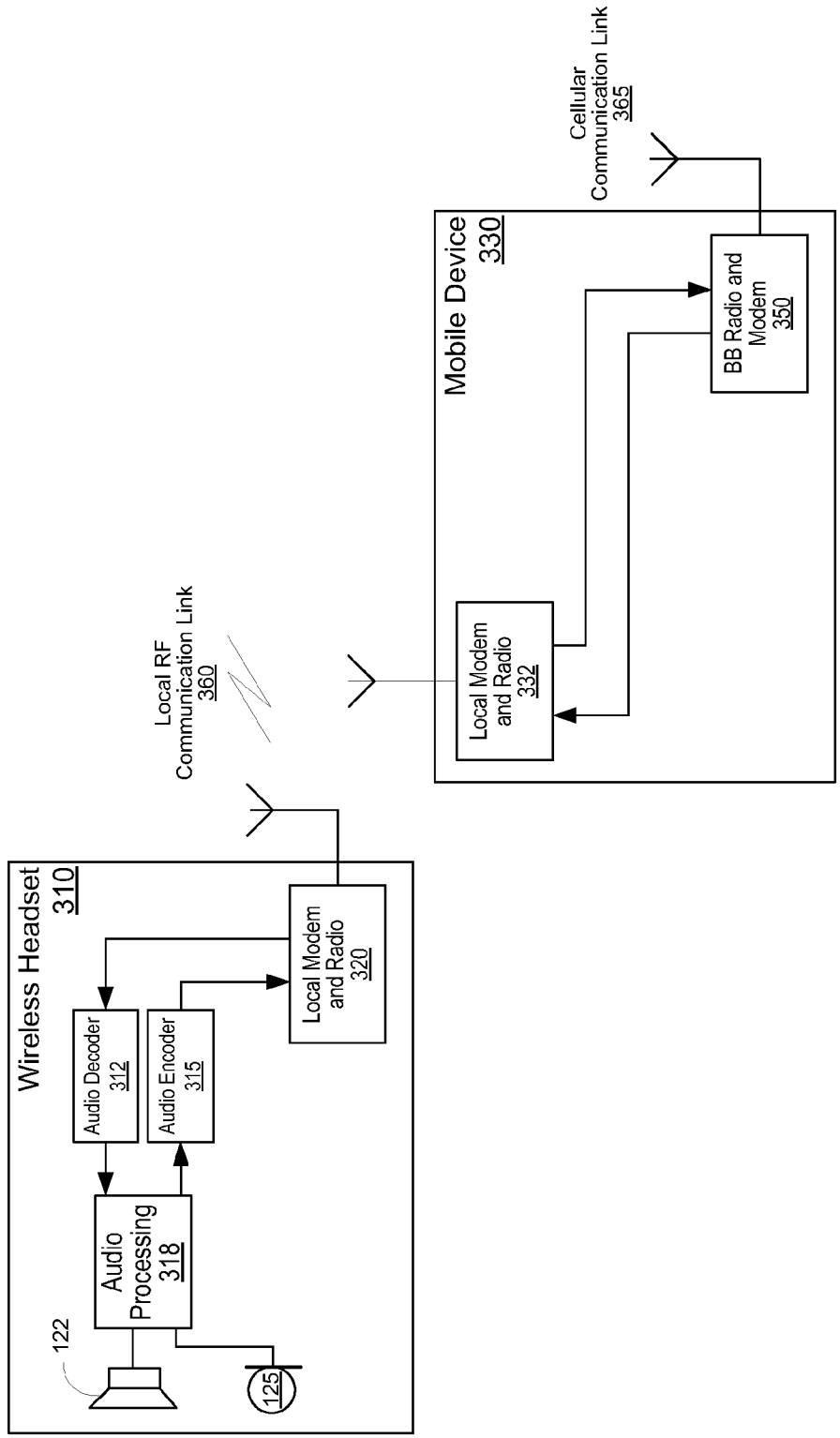
FIG. 3 illustrates a detailed diagram of a headset system that performs cellular packet audio encoding and decoding at the headset during a telephone call in accordance with one embodiment of the invention.

FIG. 3 illustrates a detailed diagram of a headset system that performs cellular packet audio encoding and decoding at the headset during a telephone call in accordance with one embodiment of the invention. A wireless headset 310 is connected to a mobile device 330 through a local RF communication link 360. In one embodiment, the local RF communication link 360 is a short-range communication channel, e.g., Wi-Fi or Bluetooth. The wireless headset 310 includes a cellular packet audio decoder 312, a cellular packet audio encoder 315, a local modem and radio module 320, a speaker 122, and a microphone 125. In one embodiment, the wireless headset 310 is the headset 210 described in FIG. 2 above. The mobile device 330 enables a near-end user of the wireless headset 310 to make and receive telephone calls with a far-end user over a cellular communication link 365. The cellular communication link 365 could be of 2G, 3G connection (GSM, UMTS, CDMA, CDMA2000), or LTE packet connection. Encoded audio packets are packaged inside this communications channel in the form of AMR, AMR-WB, or Enhance Variable Rate Codec (EVRC). The mobile device 330 includes a local modem and radio module 332 and a baseband radio and modem 350. In one embodiment, the mobile device is the mobile device 220 described in FIG. 2 above. The local modem and radio modules 320 and 332 use a wireless communication protocol, e.g., Bluetooth and Wi-Fi, to communication with each other.

The local modem and radio module 320 of the wireless headset 310 sends and receives cellular packets to and from the mobile device 330 over the local RF communication link 360. In one embodiment, the cellular packets are encapsulated inside the data packets for the local RF communication protocol. The cellular packet audio decoder 312 receives downlink cellular packets from the local modem and radio module 320 and decodes the downlink cellular packets into a downlink audio signal, in accordance with an audio decoding algorithm that is the complement of the audio encoding algorithm applied by the cellular network to the downlink signal. The audio processing unit 318 receives the downlink audio signal from the cellular packet audio decoder 312, processes the downlink audio signal, and sends the processed downlink audio signal to the speaker 122 to be converted into sound. The audio processing unit 318 also receives an uplink audio signal produced by microphone 125, processes the uplink audio signal, and sends the processed uplink audio signal to the cellular packet audio encoder 315. In one embodiment, the audio processing unit 318 performs one or more operations (e.g., equalization, dynamic range control, noise reduction, and automatic gain control) to enhance intelligibility of speech by the near end and far-end users. The cellular packet audio encoder 315 encodes the uplink audio signal into uplink cellular packets in accordance with an audio encoding algorithm that is the complement of the audio decoding algorithm which will be applied by the cellular network to the encoded uplink packets. The uplink cellular packets are sent to the local modem and radio module 320, which in turn sends the uplink cellular packets to the mobile device 330 over the local RF communication link 360.

The baseband radio and modem 350 of the mobile device 330 sends and receives cellular packets to and from the far-end user through the cellular communication link 365. The baseband radio and modem 350 forwards the received cellular packets to the local modem and radio module 332 without audio decoding them, which sends the cellular packets to the wireless headset 310 over the local RF communication link 360. The baseband radio and modem 350 also receives cellular packets from the local modem and radio module 332, which received the cellular packets from the wireless headset 310 through the local RF communication link 360 and sends them to the network without audio encoding them for transmission over the cellular network.

During a telephone call, the baseband radio and modem 350 of the mobile device 330 receives downlink cellular packets from the far-end user through the cellular communication link 365. The baseband radio and modem 350 sends the downlink cellular packets to the local modem and radio module 332. The local modem and radio module 332 sends the downlink cellular packets to the wireless headset 310 through the local RF communication link 360.

The local modem and radio module 320 of the wireless headset 310 receives the downlink cellular packets from the mobile device 330 through the local RF communication link 360. The local modem and radio module 320 then sends the downlink cellular packets to the cellular packet audio decoder 312, which decodes the downlink cellular packets into a downlink audio signal. The audio processing unit 318 receives the downlink audio signal, processes it, and sends the processed audio signal to the speaker 122. The speaker 122 converts the downlink audio signal into sound for the user of the wireless headset 310 to hear.

The microphone 125 of the wireless headset 310 produces an uplink audio signal and sends the uplink audio signal to the audio processing unit 318. The audio processing unit 318 receives the uplink audio signal, processes it, and sends the processed uplink audio signal to the cellular packet audio encoder 315. The cellular packet audio encoder 315 encodes the uplink audio signal into uplink cellular packets. The local modem and radio module 320 receives the uplink cellular packets from the cellular packet audio encoder 315 and sends the uplink cellular packets to the mobile device 330 over the local RF communication link 360.

The local modem and radio module 332 of the mobile device 330 receives the uplink cellular packets from the wireless headset 310 through the local RF communication link 360. The local modem and radio module 332 then sends the uplink cellular packets to the baseband radio and modem 350, which in turn sends the uplink cellular packets to the device of the far-end user through the cellular communication link 365.

As illustrated in FIG. 3, during a telephone call, the incoming/downlink audio signal is decoded by the cellular packet audio decoder 312 at the wireless headset 310. During the same telephone call, the outgoing/uplink audio signal is encoded by the cellular packet audio encoder 315 at the wireless headset 310. No encoding or decoding of the audio signals is performed at the mobile device 330. Therefore, instead of having two stages of audio signal encoding and decoding as described in FIG. 1 above, there is only a single stage of audio signal encoding and decoding. As a result, the audio quality of uplink and downlink audio signals may be improved, encoding and decoding delays may be reduced, and packet level buffering may also be reduced. In addition, raw pulse-code modulation (PCM) transport buffering (used for a decoded audio signal in the mobile device of FIG. 1) may not be needed.

The embodiment described in FIG. 3 refers to the use of cellular communication link by the mobile device 330 to receive and send from/to a cellular communication network, e.g., 2G, 3G, GSM, UMTS, CDMA, CDMA2000, 1× Advanced, VoLTE, In one embodiment, instead of receiving downlink audio signal and sending uplink audio signal through a cellular communication link, the mobile device 330 can receive downlink audio signal and send uplink audio signal through a Wi-Fi link, e.g., based on the IEEE 802.11 standards. In yet another embodiment, the mobile device 330 can receive downlink audio signal and send uplink audio signal through a WiMAX link, e.g., based on the IEEE 802.16 standards. In these alternative embodiments, the audio signal may be speech encoded with audio codecs such as Speex, SILK, Opus, G.711, internet Speech Audio Codec (iSAC), and Internet Low Bitrate Codec (iLBC).

The wireless headset 310 and the mobile device 330 are described above for one embodiment of the invention. One of ordinary skill in the art will realize that in other embodiments, this system can be implemented differently. For instance, in one embodiment described above, certain modules are implemented as software modules for example to be executed by an application processor or a system-on-chip (SoC). However, in another embodiment, some or all of the modules might be implemented by hardwired or programmable logic gates, which can be dedicated application specific hardware (e.g., an application specific integrated circuit, ASIC, chip or component) or a general purpose chip (e.g., a microprocessor or field programmable gate array, FPGA).

Figure 4:
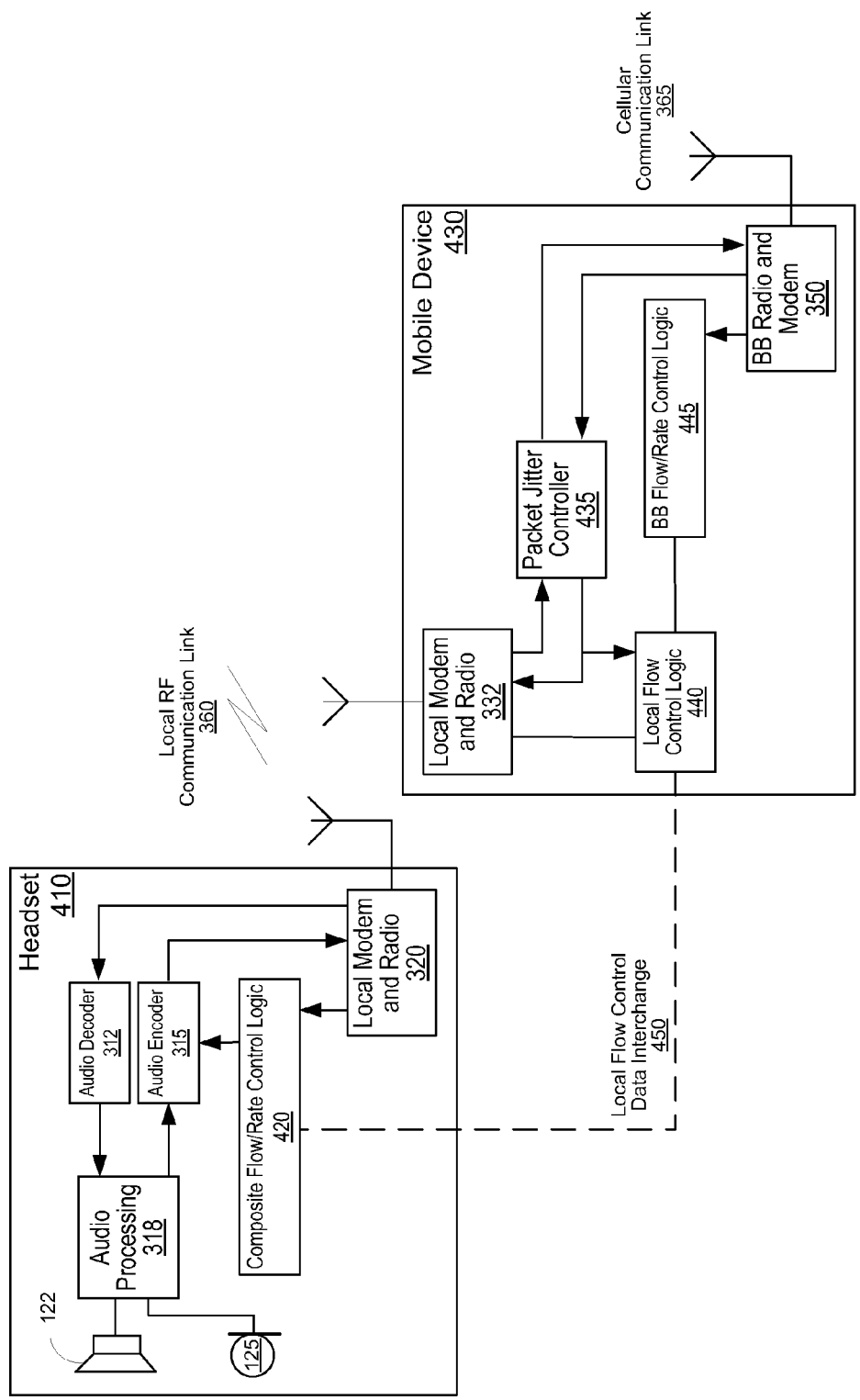
FIG. 4 illustrates a detailed diagram of a headset system that that performs cellular packet audio encoding and decoding at the headset with composite flow control in accordance with one embodiment of the invention.

FIG. 4 illustrates a detailed diagram of a headset system that that performs cellular packet audio encoding and decoding at the headset with composite flow control in accordance with one embodiment of the invention. Specifically, this figure shows a headset 410 connected to a mobile device 430 through a local RF communication link 360. The headset 410 is similar to the wireless headset 310 described in FIG. 3 above. In one embodiment, in addition to the components of the wireless headset 310, the headset 410 includes a composite flow/rate control logic 420. The mobile device 430 is similar to the mobile device 330 described in FIG. 3 above. In one embodiment, in addition to the components of the mobile device 330, the mobile device 430 includes a packet jitter controller 435, a local flow control logic 440, and a baseband flow/rate control logic 445.

The composite flow/rate control logic 420 of the headset 410 manages packet flow for the local RF communication link 360 and the cellular communication link 365, as well as encoder operating point of the cellular packet audio encoder 315. Through a local flow control data interchange 450, the composite flow/rate control logic 420 exchanges information with the local flow control logic 440 and baseband flow/rate control logic 445. Therefore, the composite flow/rate control logic 420 controls packet flow for both the local RF communication link 360 and the cellular communication link 365. In one embodiment, the composite flow/rate control logic 420 receives information about the cellular communication link 365 from the baseband flow/rate control logic 445, and receives information about the local RF communication link 360 from the local flow control logic 440. The local flow control logic 440 manages the rate of data transmission from the mobile device 430 to the headset 410 based on parameters received from the composite flow/rate control logic 420. The baseband flow/rate control logic 445 manages the rate of data transmission from the mobile device 430 to the device of the far-end user over the cellular communication link 365 based on parameters received from the composite flow/rate control logic 420. In one embodiment, the baseband flow/rate control logic 445 connects to the composite flow/rate control logic 420 through the local flow control logic 440. In another embodiment, the baseband flow/rate control logic 445 connects to the composite flow/rate control logic 420 directly.

The local flow control data interchange 450 is conducted over the local RF communication link 360. In one embodiment, the flow control data is transmitted as a section in the regular data packet for the local RF communication link 360. In another embodiment, the flow control data is transmitted through special flow control packets over the local RF communication link 360. The packet jitter controller 435 handles local retransmissions of the packets. In one embodiment, the packet jitter controller 435 can optionally open up a cellular packet and fix errors in it.

During a telephone call, the baseband radio and modem 350 of the mobile device 430 receives downlink cellular packets from the far-end user through the cellular communication link 365. The baseband radio and modem 350 sends the downlink cellular packets to the local modem and radio module 332 by passing through the packet jitter controller 435. The local modem and radio module 332 sends the downlink cellular packets to the headset 410 through the local RF communication link 360. The transmission rate of the downlink cellular packet over the local RF communication link 360 is controlled by the composite flow/rate control logic 420 through the local flow control logic 440.

The local modem and radio module 320 of the headset 410 receives the downlink cellular packets from the mobile device 330 through the local RF communication link 360. The local modem and radio module 320 then sends the downlink cellular packets to the cellular packet audio decoder 312, which decodes the downlink cellular packets into a downlink audio signal. The audio processing unit 318 receives the downlink audio signal, processes it, and sends the processed audio signal to the speaker 122. The speaker 122 plays back the downlink audio signal to the user of the headset 410.

The microphone 125 of the headset 410 produces an uplink audio signal and sends it to the audio processing unit 318. The audio processing unit 318 receives the uplink audio signal, processes it, and sends the processed uplink audio signal to the cellular packet audio encoder 315. The cellular packet audio encoder 315 encodes the uplink audio signal into uplink cellular packets. The local modem and radio module 320 receives the uplink cellular packets from the cellular packet audio encoder 315 and sends the uplink cellular packets to the mobile device 430 over the local RF communication link 360. The transmission rate of the uplink cellular packets over the local RF communication link 360 is controlled by the composite flow/rate control logic 420.

The local modem and radio module 332 of the mobile device 430 receives the uplink cellular packets from the headset 410 through the local RF communication link 360. The local modem and radio module 332 then sends the uplink cellular packets to the baseband radio and modem 350 by passing through the packet jitter controller 435. The baseband radio and modem 350 in turn sends the uplink cellular packets to the device of the far-end user through the cellular communication link 365. The transmission rate of the uplink cellular packets over the cellular communication link 365 is controlled by the composite flow/rate control logic 420 through the baseband flow/rate control logic 445.

As illustrated in FIG. 4, during a telephone call, the incoming/downlink audio signal is decoded by the cellular packet audio decoder 312 at the headset 410. During the same telephone call, the outgoing/uplink audio signal is encoded by the cellular packet audio encoder 315 at the headset 410. No encoding or decoding of the audio signals is performed at the mobile device 430. Therefore, instead of having two stages of audio signal encoding and decoding as described in FIG. 1 above, there is only a single stage of audio signal encoding and decoding. As a result, the audio quality of uplink and downlink audio signals is improved. Encoding and decoding delays are reduced. Packet level buffering is also reduced. In addition, raw pulse-code modulation (PCM) transport buffering is not needed.

Because the composite flow/rate control logic 420 is used to manage packet flow for the local RF communication link 360 and the cellular communication link 365, there is robust flow control with signal encoding and decoding. The encoder operating point of the cellular packet audio encoder 315 can be changed based on the conditions of both the cellular communication link 365 and the local RF communication link 360. For example, if one of the cellular communication link 365 and the local RF communication link 360 has poor connection quality, the cellular packet audio encoder 315 can use a lower bit rate in encoding the uplink audio signal. If both the cellular communication link 365 and the local RF communication link 360 have excellent connection quality, the cellular packet audio encoder 315 can use a higher bit rate in encoding the uplink audio signal.

The headset 410 and the mobile device 430 are described above for one embodiment of the invention. One of ordinary skill in the art will realize that in other embodiments, this system can be implemented differently. For instance, in one embodiment described above, certain modules are implemented as software modules. However, in another embodiment, some or all of the modules might be implemented by hardware, which can be dedicated application specific hardware (e.g., an application specific integrated circuit, ASIC, chip or component) or a general purpose chip (e.g., a microprocessor or field programmable gate array, FPGA).

Figure 5:
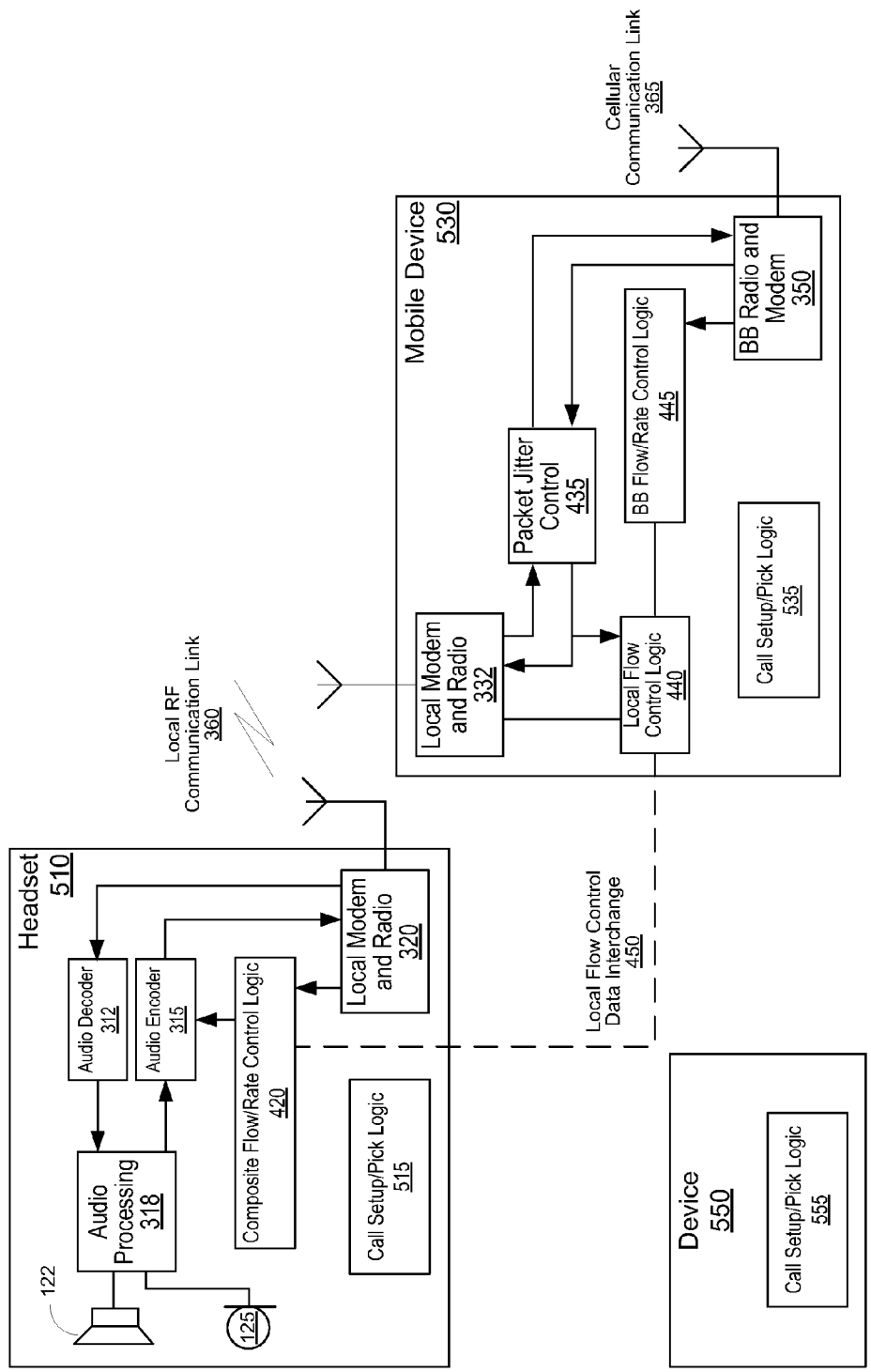
FIG. 5 illustrates a detailed diagram of a headset system that enables different call setup approaches by performing cellular packet audio encoding and decoding at the headset in accordance with one embodiment of the invention.

FIG. 5 illustrates a detailed diagram of a headset system that enables different call setup approaches by performing cellular packet audio encoding and decoding at the headset in accordance with one embodiment of the invention. Specifically, this figure shows a headset 510 connected to a mobile device 530 through a local RF communication link 360. In one embodiment, the headset system also includes an additional device 550. The device 550 includes a call setup/pick logic 555.

In one embodiment, the headset 510 is similar to the wireless headset 310 described in FIG. 3 above. In another embodiment, the headset 510 is similar to the headset 410 described in FIG. 4 above. In one embodiment, in addition to the components of the wireless headset 310 or headset 410, the headset 510 includes a call setup/pick logic 515. In one embodiment, the mobile device 530 is similar to the mobile device 330 described in FIG. 3 above. In another embodiment, the mobile device 530 is similar to the mobile device 430 described in FIG. 4 above. In one embodiment, in addition to the components of the mobile device 330 or mobile device 430, the mobile device 430 includes a call setup/pick logic 535.

Because the encoding and decoding of the cellular packets is at the headset 510, packets from any cellular modem can be used in this headset system. Therefore, the mobile device 530 can be a cellphone, a smartphone, a tablet computer, a PDA, a laptop computer, a device equipped on a vehicle, a boat, or a bicycle and capable of receiving and sending cellular packets, or any personal electronic device that is capable of receiving and sending cellular packets.

In one embodiment, the call setup/pick logic 515 of the headset 510 can perform continuous voice activity detection with a phrase identification logic (not shown) to enable hands-free operations, e.g., initiating or ending a telephone call. The phrase identification logic runs continuously and can identify short phrases such as "call home" and "pickup". Once the call setup/pick logic 515 detects a voice command related to setting up or picking up a telephone call, the call setup/pick logic 515 can communicate to the mobile device 530 to enable/establish the call and route cellular packets to the headset 510.

The call setup/pick logic 535 of the mobile device 530 enables a user to set up or pick up a telephone call, e.g., by pressing a button or key at the mobile device 530. As discussed above, the mobile device 530 can be a full-function cellphone/smartphone, a device equipped on a vehicle, a boat, or a bicycle and capable of receiving and sending cellular packets, or just a personal electronic device capable of routing cellular packets to the headset 510.

In one embodiment, the device 550 is a separate electronic device, e.g., eye glasses, that is capable of performing certain functions that may or may not relate to telephone calls. The call setup/pick logic 555 of the device 550 can detect user commands of setting up or picking up a telephone call through, e.g., eye tracking or camera based technology. Once the call setup/pick logic 555 detects a user command related to setting up or picking up a telephone call, the call setup/pick logic 555 can communicate to the mobile device 530 to enable/establish the call and route cellular packets to the headset 510.

Even though the call setup/pick logics 515, 535, and 555 are all described in the embodiment in FIG. 5, one of ordinary skill in the art will recognize that in other embodiments, this system can be implemented differently, e.g., by having one or two of the call setup/pick logics 515, 535, and 555 in the system. The device 550 is optional. In one embodiment, the functionality of the device 550 can be incorporated into either the headset 510 or the mobile device 530. In one embodiment, the functionality of the mobile device 530 can be incorporated into the headset 510. As a result, the headset 510 can be used by a near-end user to conduct a telephone call with a far-end user without the assistance of any other device.

The headset 510, the mobile device 530, and the device 550 are described above for one embodiment of the invention. One of ordinary skill in the art will realize that in other embodiments, this system can be implemented differently. For instance, in one embodiment described above, certain modules are implemented as software modules. However, in another embodiment, some or all of the modules might be implemented by hardware, which can be dedicated application specific hardware (e.g., an application specific integrated circuit, ASIC, chip or component) or a general purpose chip (e.g., a microprocessor or field programmable gate array, FPGA).

Figure 6:
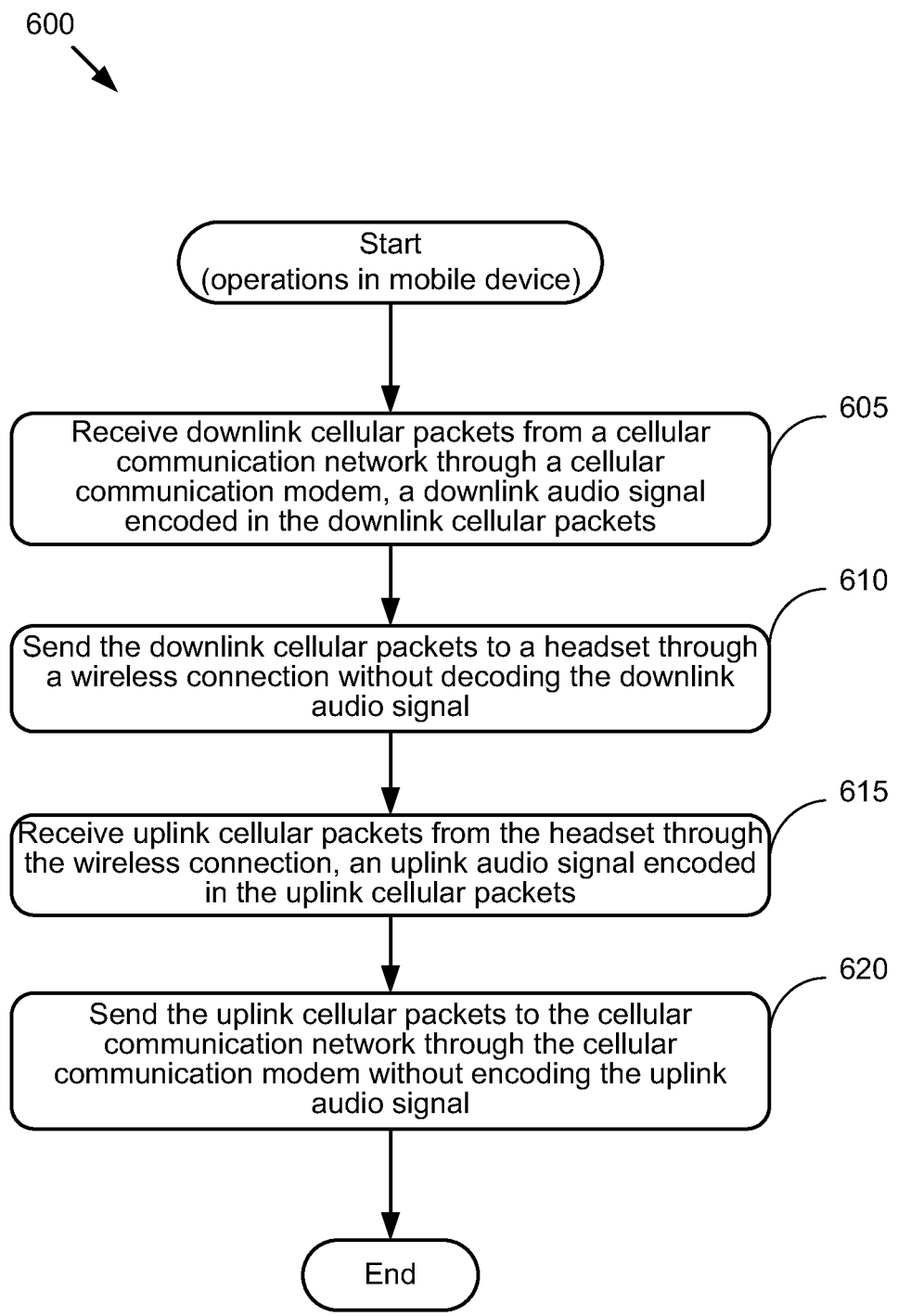
FIG. 6 illustrates a flowchart of operations performed in a mobile device in accordance with one embodiment of the invention.

FIG. 6 illustrates a flowchart of operations performed in a mobile device, referred to as process 600. In one embodiment, the mobile device (e.g., the mobile device 220 of FIG. 2, the mobile device 330 of FIG. 3, the mobile device 430 of FIG. 4, or the mobile device 530 of FIG. 5) executes process 600 when a telephone call is initiated. As illustrated in FIG. 6, process 600 begins by receiving (at block 605) downlink cellular packets from a cellular communication network through a cellular communication modem. A downlink audio signal is encoded in the downlink cellular packets. The cellular communication network could be of 2G, 3G network (GSM, UMTS, CDMA, CDMA2000), or LTE network. Encoded audio packets are packaged inside this communications channel in the form of AMR, AMR-WB, or Enhance Variable Rate Codec (EVRC).

At block 610, process 600 sends the downlink cellular packets to a headset device (e.g., the headset 210 of FIG. 2, the wireless headset 310 of FIG. 3, the headset 410 of FIG. 4, or the headset 510 of FIG. 5) through a wireless connection without decoding the downlink audio signal. In one embodiment, the wireless connection is established over a short-range radio communication channel, e.g., Wi-Fi or Bluetooth.

At block 615, process 600 receives uplink cellular packets from the headset device through the wireless connection. An uplink audio signal is encoded in the uplink cellular packets. At block 620, process 600 sends the uplink cellular packets to the cellular communication network through the cellular communication modem without encoding the uplink audio signal.

In one embodiment, the transmission rate of sending the downlink cellular packets to the headset device over the wireless connection is controlled by a local flow control logic of the mobile device. The transmission rate of sending the uplink cellular packets to the cellular communication network through the cellular communication modem is controlled by a baseband flow/rate control logic of the mobile device. In one embodiment, the local flow control logic sends information about the wireless connection to a composite flow/rate control logic of the headset device and receives parameters from the composite flow/rate control logic. The local flow control logic uses the parameters received from the composite flow/rate control logic to control the transmission rate of sending the downlink cellular packets to the headset device over the wireless connection. In one embodiment, the baseband flow/rate control logic sends information about the cellular communication network to the composite flow/rate control logic of the headset device and receives parameters from the composite flow/rate control logic. The baseband flow/rate control logic uses the parameters received from the composite flow/rate control logic to control the transmission rate of sending the uplink cellular packets to the cellular communication network through the cellular communication modem.

One of ordinary skill in the art will recognize that process 600 is a conceptual representation of the operations executed by the mobile device to route cellular packets to and from the headset device without decoding or encoding the cellular packets. The specific operations of process 600 may not be performed in the exact order shown and described. The specific operations may not be performed in one continuous series of operations, and different specific operations may be performed in different embodiments. For example, the operations in blocks 615 and 620 may be performed prior to, or in parallel with the operations in blocks 605 and 610. Furthermore, process 600 could be implemented using several sub-processes, or as part of a larger macro process.

The embodiment described in FIG. 6 refers to the use of cellular communication modem of the mobile device to receive and send from/to a cellular communication network, e.g., 2G, 3G, GSM, UMTS, CDMA, CDMA2000, 1× Advanced, VoLTE, In one embodiment, instead of receiving downlink audio signal and sending uplink audio signal from/to a cellular communication network through a cellular communication modem, the mobile device can receive downlink audio signal and send uplink audio signal through a Wi-Fi link, e.g., based on the IEEE 802.11 standards. In yet another embodiment, the mobile device can receive downlink audio signal and send uplink audio signal through a WiMAX link, e.g., based on the IEEE 802.16 standards. In these alternative embodiments, the audio signal may be speech encoded with audio codecs such as Speex, SILK, Opus, G.711, internet Speech Audio Codec (iSAC), and Internet Low Bitrate Codec (iLBC).

Figure 7:
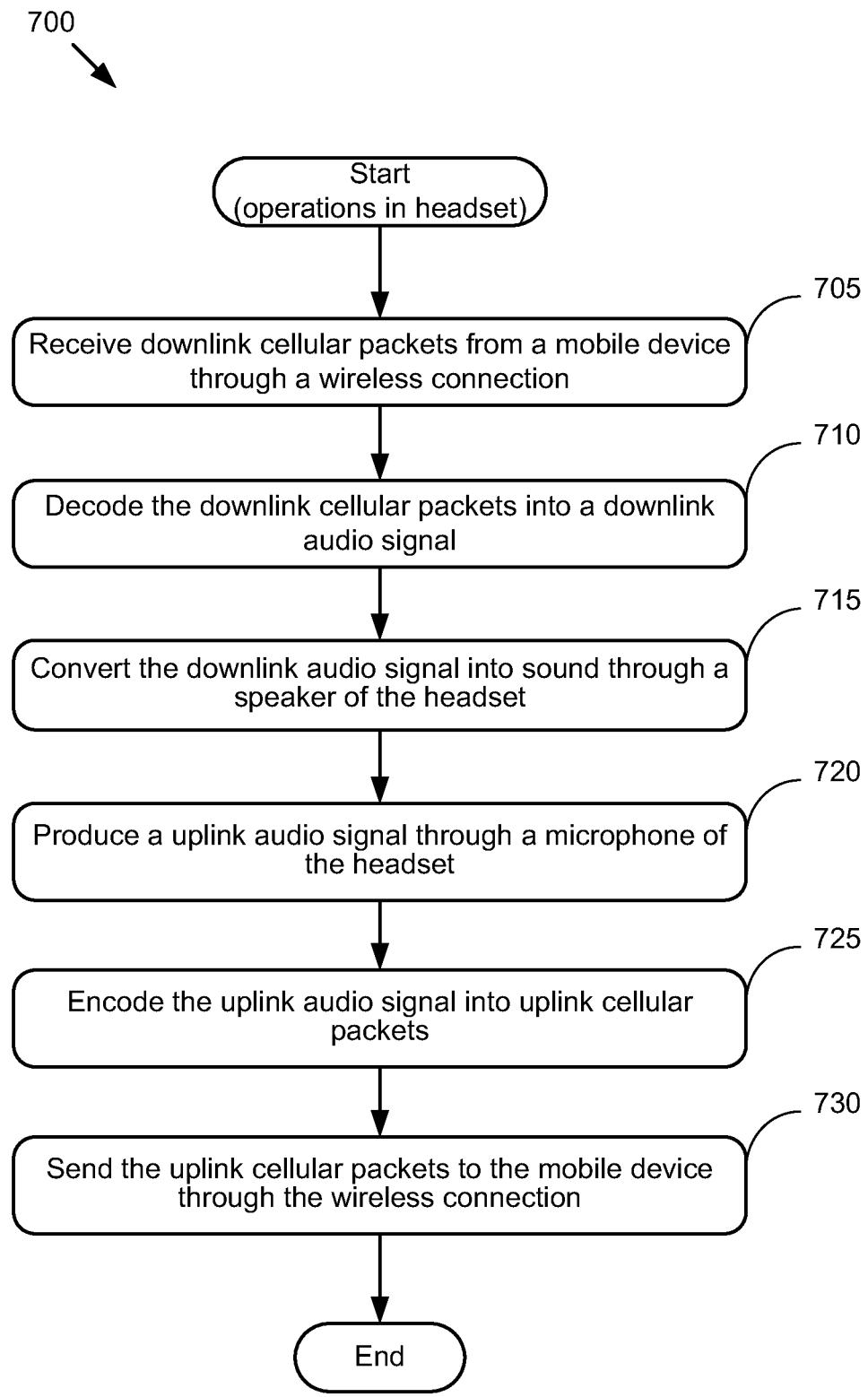
FIG. 7 illustrates a flowchart of one embodiment of operations performed in a headset device in accordance with one embodiment of the invention.

FIG. 7 illustrates a flowchart of one embodiment of operations performed in a headset device, referred to as process 700. In one embodiment, the headset device (e.g., the headset 210 of FIG. 2, the wireless headset 310 of FIG. 3, the headset 410 of FIG. 4, or the headset 510 of FIG. 5) executes process 700 when a telephone call is initiated. In one embodiment, the operations of process 700 are performed in concert with the operations of process 600 described in FIG. 6 above. As illustrated in FIG. 7, process 700 begins by receiving (at block 705) downlink cellular packets from a mobile device through a wireless connection. In one embodiment, the mobile device executes the operations of process 600 described in FIG. 6 above, and the downlink cellular packets are the downlink cellular packets described in blocks 605 and 610 of process 600.

At block 710, process 700 decodes the downlink cellular packets into a downlink audio signal. At block 715, process 700 converts the downlink audio signal into sound through a speaker of the headset device.

At block 720, process 700 produces an uplink audio signal through one or more microphones of the headset device. At block 725, process 700 encodes the uplink audio signal into uplink cellular packets. At block 730, process 700 sends the uplink cellular packets to the mobile device through the wireless connection. In one embodiment, the mobile device executes the operations of process 600 described in FIG. 6 above, and the uplink cellular packets are the uplink cellular packets described in blocks 615 and 620 of process 600.

In one embodiment, the transmission rate of sending the uplink cellular packets to the mobile device over the wireless connection by the headset device is controlled by a composite flow/rate control logic of the headset device. In one embodiment, the composite flow/rate control logic of the headset device receives information about the wireless connection and the cellular communication network from local flow control logics of the mobile device. In one embodiment, the composite flow/rate control logic of the headset device sends parameters to the local flow control logics of the mobile device to control the transmission rate of sending the downlink cellular packets to the headset device by the mobile device. In one embodiment, the composite flow/rate control logic sends parameters to the local flow control logics of the mobile device to control the transmission rate of sending the uplink cellular packets to the cellular communication network by the mobile device.

One of ordinary skill in the art will recognize that process 700 is a conceptual representation of the operations executed by the headset device. The specific operations of process 700 may not be performed in the exact order shown and described. The specific operations may not be performed in one continuous series of operations, and different specific operations may be performed in different embodiments. For example, the operations in blocks 720, 725, and 730 may be performed prior to, or in parallel with the operations in blocks 705, 710, and 715. Furthermore, process 700 could be implemented using several sub-processes, or as part of a larger macro process.

Figure 8:
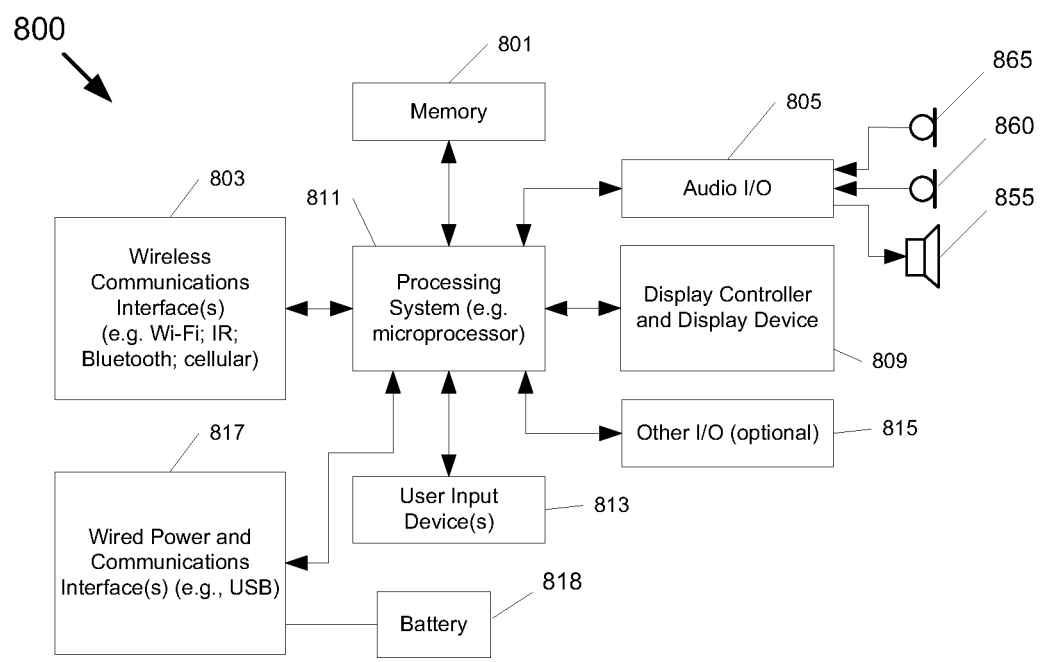
FIG. 8 shows an example of a data processing system which may be used with one embodiment of the invention.

FIG. 8 shows an example of a data processing system 800 which may be used with one embodiment of the invention. Specifically, this figure shows a data processing system 800. The data processing system 800 shown in FIG. 8 includes a processing system 811, which may be one or more microprocessors or a system on a chip integrated circuit. The data processing system 800 also includes memory 801 for storing data and programs for execution by the processing system 811. The data processing system 800 also includes an audio input/output subsystem 805, which may include a primary microphone 865, a secondary microphone 860, and a speaker 855, for example, for playing back music or providing telephone functionality through the speaker and microphones.

A display controller and display device 809 provide a digital visual user interface for the user; this digital interface may include a graphical user interface similar to that shown on a Macintosh computer when running the OS X operating system software, or an Apple iPhone when running the iOS operating system, etc. The system 800 also includes one or more wireless communications interfaces 803 to communicate with another data processing system, such as the system 800 of FIG. 8. A wireless communications interface may be a WLAN transceiver, an infrared transceiver, a Bluetooth transceiver, and/or a cellular telephony transceiver. It will be appreciated that additional components, not shown, may also be part of the system 800 in certain embodiments, and in certain embodiments fewer components than shown in FIG. 8 may also be used in a data processing system. The system 800 further includes one or more wired power and communications interfaces 817 to communicate with another data processing system. The wired power and communications interface may be a USB port, etc. and may connect to a battery 818.

The data processing system 800 also includes one or more user input devices 813, which allow a user to provide input to the system. These input devices may be a keypad or keyboard, or a touch panel or multi touch panel. The data processing system 800 also includes an optional input/output device 815 which may be a connector for a dock. It will be appreciated that one or more buses, not shown, may be used to interconnect the various components as is well known in the art. The data processing system shown in FIG. 8 may be a handheld device or a personal digital assistant (PDA), or a cellular telephone with PDA-like functionality, or a handheld device which includes a cellular telephone, or a media player such as an iPod, or a device which combines aspects or functions of these devices such as a media player combined with a PDA and a cellular telephone in one device or an embedded device or other consumer electronic devices. In other embodiments, the data processing system 800 may be a network computer or an embedded processing device within another device or other type of data processing systems, which have fewer components or perhaps more components than that shown in FIG. 8.

The digital signal processing operations described above, such as encoding and decoding of cellular packets, flow/rate control, packet jitter control, setup or pickup of telephone call, and the audio signal processing including for example filtering, noise estimation, and noise suppression, can all be done either entirely by a programmed processor, or portions of them can be separated out and be performed by dedicated hardwired logic circuits.

The foregoing discussion merely describes some exemplary embodiments of the invention. One skilled in the art will readily recognize from such discussion, from the accompanying drawings, and from the claims that various modifications can be made without departing from the spirit and scope of the invention.

What is claimed is:

1. A headset to communicate with a mobile device through a local radio frequency (RF) communication link to conduct a telephone call, the headset comprising:
    a local RF communication modem that is configured to receive a plurality of downlink packets for the telephone call from the mobile device through the local RF communication link, wherein the plurality of downlink packets were received by the mobile device through a wireless communication link with a far end device;
    an audio decoder that is configured to decode the plurality of downlink packets into a downlink audio signal to be converted into sound at the headset;
    an audio encoder that is configured to encode an uplink audio signal produced by the headset for the telephone call into a plurality of uplink packets, wherein the local RF communication modem is to send the plurality of uplink packets to the mobile device through the local RF communication link and wherein the uplink audio signal as encoded in the plurality of uplink packets is not audio encoded in the mobile device, before transmission through the wireless communication link with the far end device; and
    a composite flow control logic that is configured to:
        control a first data transmission rate for transmitting data from the headset to the mobile device over the local RF communication link,
        control, through a local flow control logic at the mobile device, a second data transmission rate for transmitting data from the mobile device to the headset over the local RF communication link, and
        control, through a baseband flow control logic at the mobile device, a third data transmission rate for transmitting data from the mobile device to the far-end device over the wireless communication link, wherein the composite flow control logic comprises
        a local flow control data interchange for exchanging flow control data with the local flow control logic and the baseband flow control logic.

2. The headset of claim 1, wherein the plurality of uplink and downlink packets are encapsulated inside local RF packets when transmitted over the local RF communication link, wherein the wireless communication link is a cellular communication link.

3. The headset of claim 1 further comprising audio processing circuitry to perform one or more of the following operations to enhance intelligibility of speech by far-end users: equalization; dynamic range control; noise reduction; and automatic gain control.

4. The headset of claim 1, wherein the composite flow control logic is to exchange flow control data with the local flow control logic and the baseband flow control logic by encapsulating the flow control data as a section inside regular local RF data packets that are transmitted over the local RF communication link.

5. The headset of claim 1, wherein the composite flow control logic is to exchange flow control data with the local flow control logic and the baseband flow control logic by transmitting the flow control data as flow control packets.

6. The headset of claim 1 further comprising a call setup logic that is to perform continuous voice activity detection.

7. The headset of claim 6, wherein the call setup logic comprises a phrase identification logic that is to identify phrases uttered by a user of the headset.

8. A method for a headset to communicate with a mobile device through a local radio frequency (RF) communication link to conduct a telephone call, the method comprising:
    receiving a first plurality of packets for the telephone call from the mobile device through the local RF communication link;
    decoding the first plurality of packets into a first audio signal;
    encoding a second audio signal for the telephone call into a second plurality of packets for the telephone call;
    sending the second plurality of packets to the mobile device through the local RF communication link wherein the second audio signal, as encoded in the plurality of packets sent to the mobile device, is not audio encoded in the mobile device before transmission through a wireless communication link;
    controlling, by a composite flow control logic in the headset, a first data transmission rate for transmitting data from the headset to the mobile device over the local RF communication link;
    controlling, by the composite flow control logic, through a local flow control logic at the mobile device, a second data transmission rate for transmitting data from the mobile device to the headset over the local RF communication link; and
    controlling, by the composite flow control logic, through a baseband flow control logic at the mobile device, a third data transmission rate for transmitting data from the mobile device to a far-end device over the wireless communication link, wherein the composite flow control logic comprises a local flow control data interchange for exchanging flow control data with the local flow control logic and the baseband flow control logic.

9. The method of claim 8 further comprising:
    processing the first audio signal; and
    playing back the processed first audio signal through a speaker of the headset.

10. The method of claim 8 further comprising producing the second audio signal through a microphone of the headset.

11. A headset to communicate with a mobile device through a local RF communication link to conduct a telephone call, the headset comprising:
   a local RF communication modem that is to receive a plurality of downlink packets for the telephone call from the mobile device through the local RF communication link, wherein the downlink packets are encapsulated inside local RF packets when transmitted or received over the local RF communication link, and wherein the plurality of downlink packets had been received by the mobile device through a cellular wireless communications link;
   an audio decoder that is to decode the plurality of downlink packets into a downlink audio signal to be converted into sound at the headset;
   an audio encoder that is to encode an uplink audio signal produced by the headset for the telephone call into a plurality of uplink packets, wherein the local RF communication modem is to send the plurality of uplink packets to the mobile device through the local RF communication link as the plurality of uplink packets are encapsulated inside local RF packets when transmitted over the local RF communication link;
   a composite flow control logic that is configured to:
      control a first data transmission rate for transmitting data from the headset to the mobile device over the local RF communication link,
      control, through a local flow control logic at the mobile device, a second data transmission rate for transmitting data from the mobile device to the headset over the local RF communication link, and
      control, through a baseband flow control logic at the mobile device, a third data transmission rate for transmitting data from the mobile device to a far-end device over the wireless communication link, wherein the composite flow control logic comprises a local flow control data interchange for exchanging flow control data with the local flow control logic and the baseband flow control logic;
   and wherein the uplink audio signal as it is encoded in the plurality of uplink packets is not subjected to audio decoding in the mobile device when the uplink audio signal is transmitted through the cellular wireless communication link.

12. The headset of claim 11 further comprising audio processing circuitry to perform one or more of the following operations to enhance intelligibility of speech by a far end user during the call: equalization; dynamic range control; noise reduction; and automatic gain control.

13. The headset of claim 11, wherein the composite flow control logic is to exchange flow control data with the local flow control logic and the baseband flow control logic by encapsulating the flow control data as a section inside regular local RF data packets that are transmitted over the local RF communication link.

14. The headset of claim 11, wherein the composite flow control logic is to exchange flow control data with the local flow control logic and the baseband flow control logic by transmitting the flow control data as flow control packets.

15. The headset of claim 11 wherein the local RF communication modem is a Bluetooth modem.

\* \* \* \* \*